(12) United States Patent
Lee

(10) Patent No.: US 8,453,990 B2
(45) Date of Patent: Jun. 4, 2013

(54) LIFTING ADJUSTING ASSEMBLY FOR A SHAFT

(76) Inventor: Kuo-Su Lee, Kaohsiung (TW)

( * ) Notice: Subject to any disclaimer, the term of this patent is extended or adjusted under 35 U.S.C. 154(b) by 219 days.

(21) Appl. No.: 13/074,128

(22) Filed: Mar. 29, 2011

(65) Prior Publication Data

US 2011/0248144 A1    Oct. 13, 2011

(30) Foreign Application Priority Data

Apr. 9, 2010 (TW) ................................ 99206246 U

(51) Int. Cl.
*F16B 2/16* (2006.01)

(52) U.S. Cl.
USPC ........... 248/574; 248/323; 248/333; 248/161; 403/165

(58) Field of Classification Search
CPC ........................................................ F16B 9/02
USPC ............... 248/574, 317, 323, 327, 333, 336, 248/337, 338, 200.1, 326, 161, 159; 403/322.2, 403/165
See application file for complete search history.

(56) References Cited

U.S. PATENT DOCUMENTS

| | | | | |
|---|---|---|---|---|
| 140,348 A | * | 7/1873 | Cornelius | 248/337 |
| 2,835,520 A | * | 5/1958 | Schiring et al. | 403/63 |
| 3,776,500 A | * | 12/1973 | Foderaro | 248/333 |
| 4,073,456 A | * | 2/1978 | Karapita et al. | 248/337 |
| 4,453,449 A | * | 6/1984 | Hollmann | 89/1.806 |
| 6,619,875 B2 | * | 9/2003 | Chiang | 403/322.2 |
| 8,231,096 B2 | * | 7/2012 | Lee et al. | 248/333 |
| 2008/0116333 A1 | * | 5/2008 | Chang | 248/200.1 |

FOREIGN PATENT DOCUMENTS

| DE | 4116186 A1 | * | 11/1992 |
|---|---|---|---|
| DE | 19734866 C1 | * | 2/1999 |

* cited by examiner

*Primary Examiner* — Anita M King
(74) *Attorney, Agent, or Firm* — C. G. Mersereau; Nikolai & Mersereau, P.A.

(57) ABSTRACT

A lifting-adjusting assembly for a shaft has an outer device, an inner device and multiple positioning elements. The outer device is adapted to mount around a shaft and has a base and a mounting casing. The mounting casing is mounted around the base and has a chamber, an opening and a cone surface. The inner device is movably connected to the outer device and has a moving mount and at least one spring. The moving mount is movably mounted in the outer device and has a mounting chamber, a pressing segment and multiple positioning holes. The at least one spring is mounted in the chamber to enable the positioning holes to face to the cone surface. The positioning elements are mounted in the positioning holes of the moving mount and abut with the cone surface and the shaft to hold the lifting-adjusting assembly on the shaft.

18 Claims, 21 Drawing Sheets

LIFTING ADJUSTING ASSEMBLY FOR A SHAFT

BACKGROUND OF THE INVENTION

1. Field of the Invention

The present invention relates to a lifting-adjusting assembly, and more particularly to a lifting-adjusting assembly for a shaft to adjust the position of the lifting-adjusting assembly relative to the shafts as desired.

2. Description of Related Art

A conventional display frame has multiple longitudinal shafts, multiple connectors and multiple clapboards. Each longitudinal shaft has an external surface and multiple connecting holes formed through the external surface of the longitudinal shaft at intervals. The connectors are respectively mounted in the connecting holes of the longitudinal shaft. Each clapboard is mounted on the connectors between the longitudinal shafts. The connectors can be mounted in different connecting holes of the longitudinal shaft to adjust the height of the clapboard relative to the longitudinal shafts.

However, the distances of the intervals between the connecting holes are the same and a user cannot adjust the clapboard to a desired position between the intervals between the connecting holes of the longitudinal shafts, so this is inconvenient in use and will limit the practicability of the conventional display frame. In addition, the connecting holes formed in the external surface of the longitudinal shaft will negatively affect the appearance of the conventional display frame.

SUMMARY OF THE INVENTION

The main objective of the invention is to provide a lifting-adjusting assembly for a shaft that can adjust the position of the lifting-adjusting assembly relative to the shafts as desired.

The lifting-adjusting assembly for a shaft in accordance with the present invention has an outer device, an inner device and multiple positioning elements. The outer device is adapted to mount around an external surface of a shaft and has a base and a mounting casing. The mounting casing is mounted securely around the base and has a chamber, an opening and a cone surface. The opening is formed through an upper end of the mounting casing and communicates with the chamber. The cone surface is annularly formed in the mounting casing adjacent to the opening. The inner device is movably connected to the outer device and has a moving mount and at least one spring. The moving mount is movably mounted in the outer device and has a mounting chamber, a pressing segment and multiple positioning holes. The at least one spring is mounted in the chamber between the base and the moving mount to enable the positioning holes to face to the cone surface. The positioning elements are respectively mounted in the positioning holes of the moving mount and abut with the cone surface of the mounting casing and the external surface of the shaft to hold the lifting-adjusting assembly on the shaft.

Other objectives, advantages and novel features of the invention will become more apparent from the following detailed description when taken in conjunction with the accompanying drawings.

DETAILED DESCRIPTION OF PREFERRED EMBODIMENT

With reference to FIGS. 1, 2, 10 and 11, a lifting-adjusting assembly for shafts in accordance with the present invention comprises an outer device 10, 10', an inner device 20, 20', multiple positioning elements 30, 30' and a hanging device 40, 40'.

Figure 1:
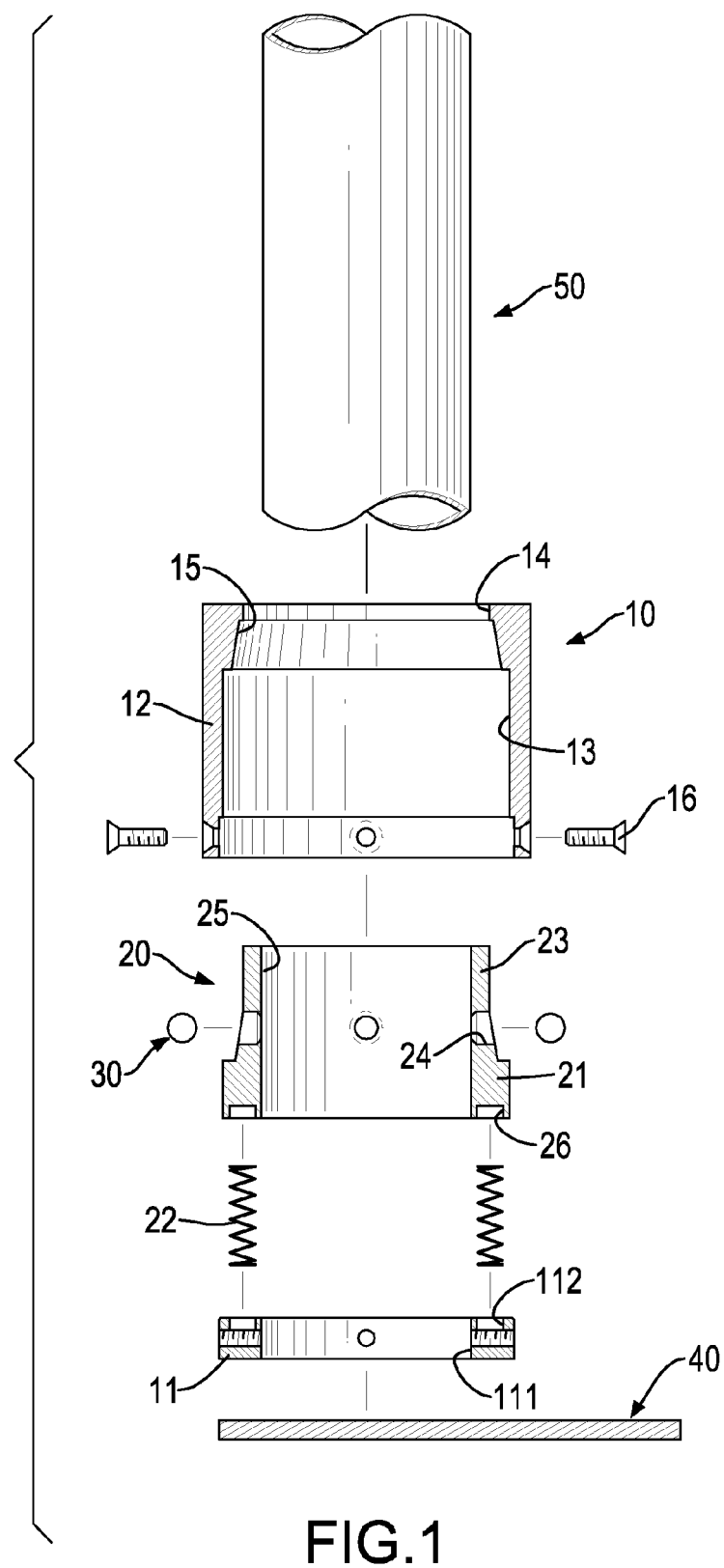
FIG. 1 is an exploded side view of a first embodiment of the lifting-adjusting assembly in accordance with the present invention.
Figure 10:
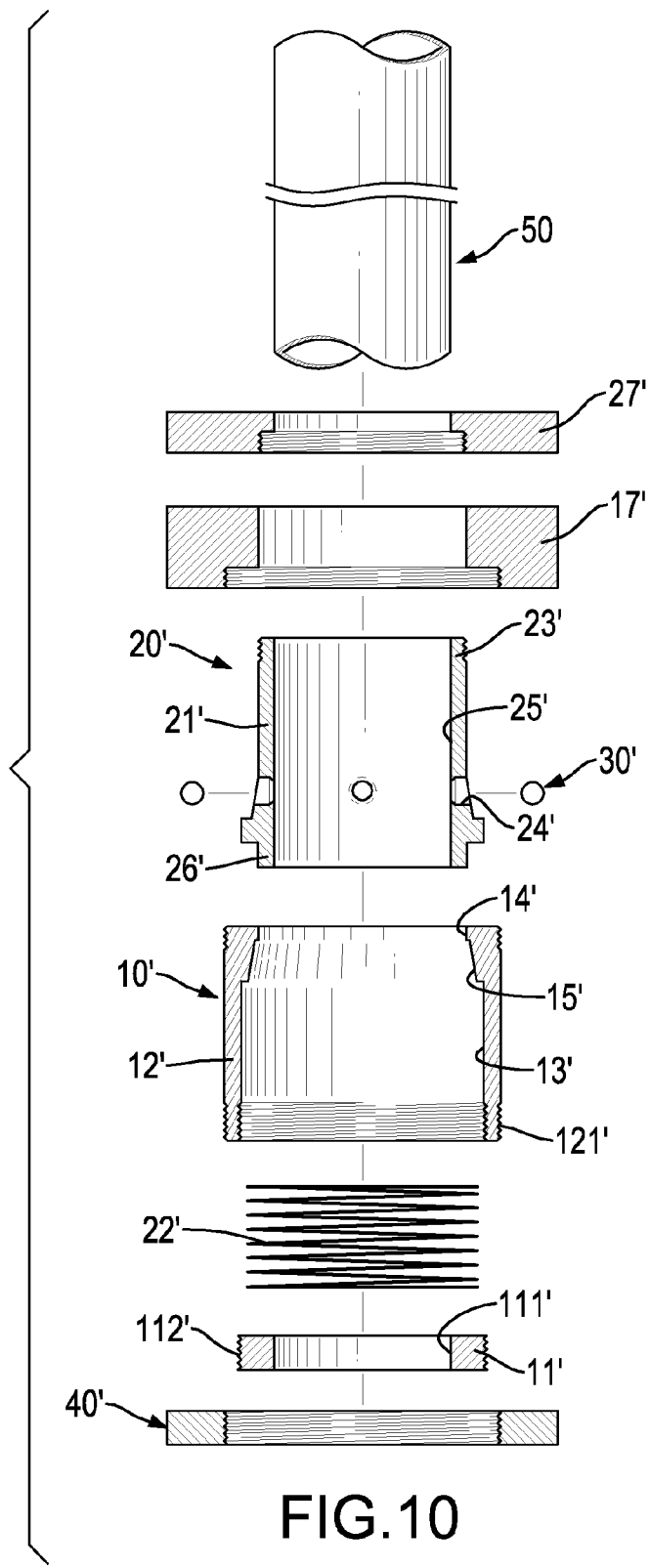
FIG. 10 is an exploded side view in partial section of a second embodiment of the lifting-adjusting assembly in accordance with the present invention.

The outer device 10, 10' can be used to mount around an external surface of a shaft 50 and has a base 11, 11' and a mounting casing 12, 12'. The base 11, 11' has a central hole 111, 111', a top surface and a sidewall. The central hole 111, 111' is formed through the base 11, 11' and is mounted around the external surface of the shaft 50. With reference to FIG. 1, the base 11 may further have multiple retaining recesses 112 formed in the top surface of the base 11 at intervals around the central hole 111 of the base 11. With reference to FIG. 10, the base 11' may further have a threaded surface 112' formed on the sidewall of the base 11'.

Figure 2:
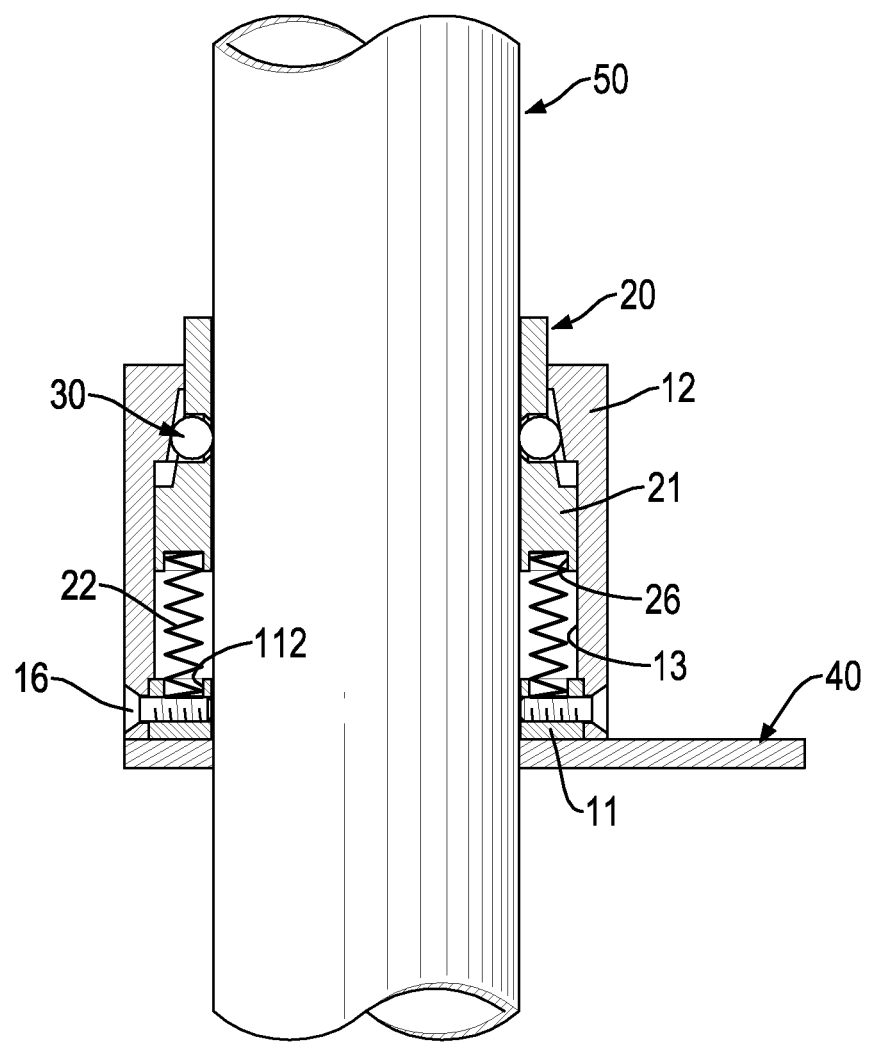
FIG. 2 is a side view in partial section of the lifting-adjusting assembly in FIG. 1 mounted around a shaft.
Figure 11:
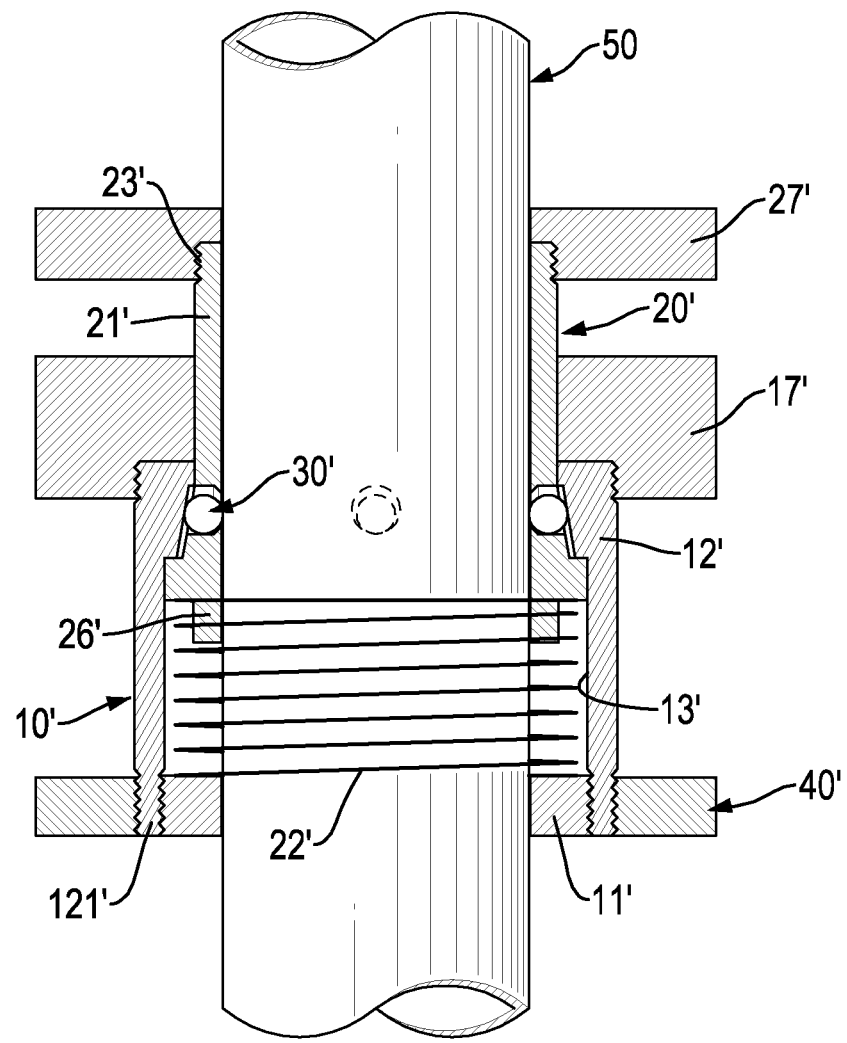
FIG. 11 is an enlarged side view in partial section of the lifting-adjusting assembly in FIG. 10 mounted around a shaft.

The mounting casing 12, 12' is mounted securely around the base 11, 11' and has a lower end, an upper end, an external surface, a chamber 13, 13', an opening 14, 14' and a cone surface 15, 15'. With reference to FIG. 2, the mounting casing 12 may further have multiple fasteners 16 mounted through the external surface of the mounting casing 12 at intervals near the lower end of the mounting casing 12 and are connected securely to the sidewall of the base 11 to hold the base 11 securely in the mounting casing 12. With reference to FIG. 11, the mounting casing 12' may further have a threaded ring 121' formed on and protruding from the lower end of the mounting casing 12' and screwed with the threaded surface 112' of the base 11' to hold the base 11' securely in the mounting casing 12'.

Figure 13:
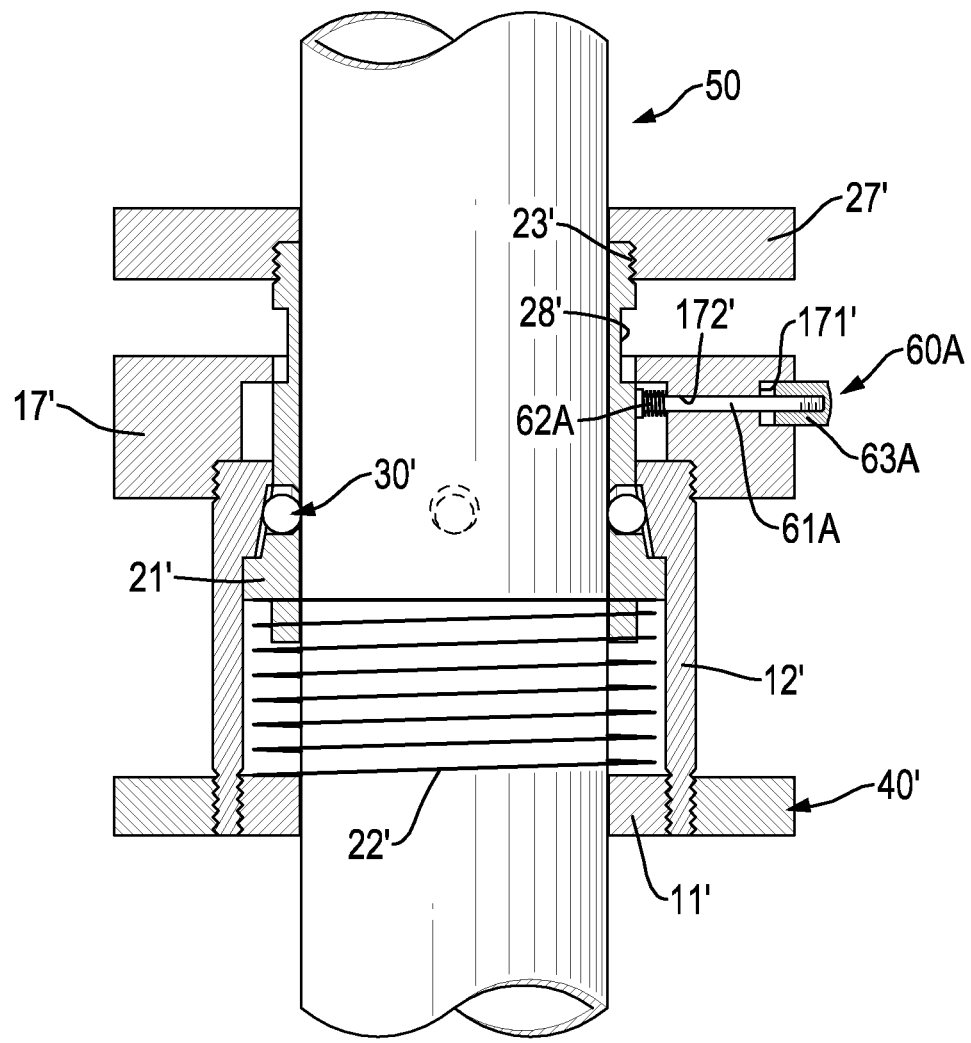
FIG. 13 is a side view in partial section of a first embodiment of a limiting device of the lifting-adjusting assembly in FIG. 10.

The chamber 13, 13' is formed in the mounting casing 12, 12' and is mounted around the external surface of the shaft 50 and the sidewall of the base 11, 11'. The opening 14, 14' is formed through the upper end of the mounting casing 12, 12' and communicates with the chamber 13, 13' to enable the shaft 50 to extend out of the upper end of the mounting casing 12, 12'. The cone surface 15, 15' is annularly formed in the mounting casing 12, 12' adjacent to the opening 14, 14'. With reference to FIG. 11, the mounting casing 12' may further have an upper cover 17' mounted securely around the upper end of the mounting casing 12' and mounted around the external surface of the shaft 50. With further reference to FIG. 13, the upper cover 17' further has an external surface, an internal surface, a mounting recess 171' and a mounting channel 172'. The mounting recess 171' is radially formed in the external surface of the upper cover 17'. The mounting channel 172' is formed through the upper cover 17' and communicates with the mounting recess 171'.

The inner device 20, 20' is movably connected to the outer device 10, 10' and has a moving mount 21, 21' and at least one spring 22, 22'. The moving mount 21, 21' is hollow, is movably mounted in the outer device 10, 10' between the base 11, 11' and the mounting casing 12, 12' and has a bottom end, a top end, an external surface, a mounting chamber 25, 25', a pressing segment 23, 23' and multiple positioning holes 24, 24'. The mounting chamber 25, 25' is formed through the moving mount 21, 21' and is mounted around the external surface of the shaft 50. The pressing segment 23, 23' is formed on the top end of the moving mount 21, 21' and extends out of the upper end of the mounting casing 12, 12' via the opening 14, 14'. With reference to FIG. 11, the pressing segment 23' of the moving mount 21' further extends out of the upper cover 17' of the mounting casing 12'. With reference to FIG. 13, the moving mount 21' further has a limiting recess 28' formed annularly in the external surface of the moving mount 21' near the top end of the moving mount 21'.

The positioning holes 24, 24' are radially formed through the external surface of the moving mount 21, 21' at intervals, communicate with the mounting chamber 25, 25' and face to the cone surface 15, 15' of the mounting casing 12, 12'. With reference to FIG. 1, the moving mount 21 further has multiple holding recesses 26 formed in the bottom end of the moving mount 21 at intervals and corresponding to the retaining recesses 112 of the base 11. With reference to FIG. 10, the moving mount 21' further has a holding ring 26' formed on and protruding downwardly from the bottom end of the moving mount 21' and facing to the top surface of the base 11'. With reference to FIG. 10, the moving mount 21' further has a pressing board 27' screwed with the pressing segment 23' of the moving mount 21' above the upper cover 17' of the mounting casing 12' and mounted around the external surface of the shaft 50.

The at least one spring 22, 22' is mounted in the chamber 13, 13' between the base 11, 11' and the moving mount 21, 21' to push the pressing segment 23, 23' of the moving mount 21, 21' to extend out of the opening 14, 14' of the mounting casing 12, 12' and to enable the positioning holes 24, 24' to face to the cone surface 15, 15' of the mounting casing 12, 12'. With reference to FIG. 2, the inner device 20 has multiple springs 22 mounted between the retaining recesses 112 of the base 11 and the holding recesses 26 of the moving mount 21. With reference to FIG. 11, the inner device 20' has a single one spring 22' mounted between the top surface of the base 11' and the bottom end of the moving mount 21' around the holding ring 26'.

Figure 3:
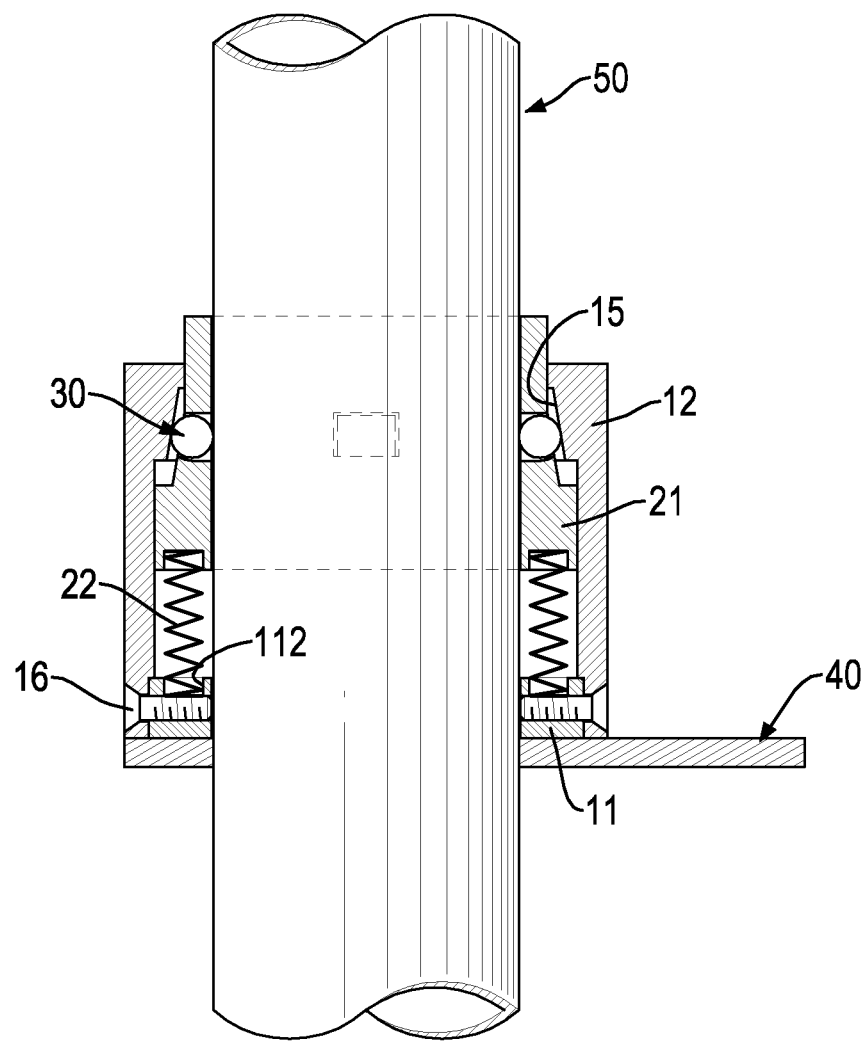
FIG. 3 is another side view in partial section of the lifting-adjusting assembly in FIG. 1 mounted around a shaft.

The positioning elements 30, 30' are respectively mounted in the positioning holes 24, 24' of the moving mount 21, 21' and abut with the cone surface 15, 15' of the mounting casing 12, 12' and the external surface of the shaft 50 to hold the lifting-adjusting assembly on the shaft 50 as shown in FIGS. 2 and 11. Preferably, each position element 30, 30' may be a steel ball as shown in FIGS. 1 and 10 or may be a cylinder as shown in FIG. 3.

Figure 9:
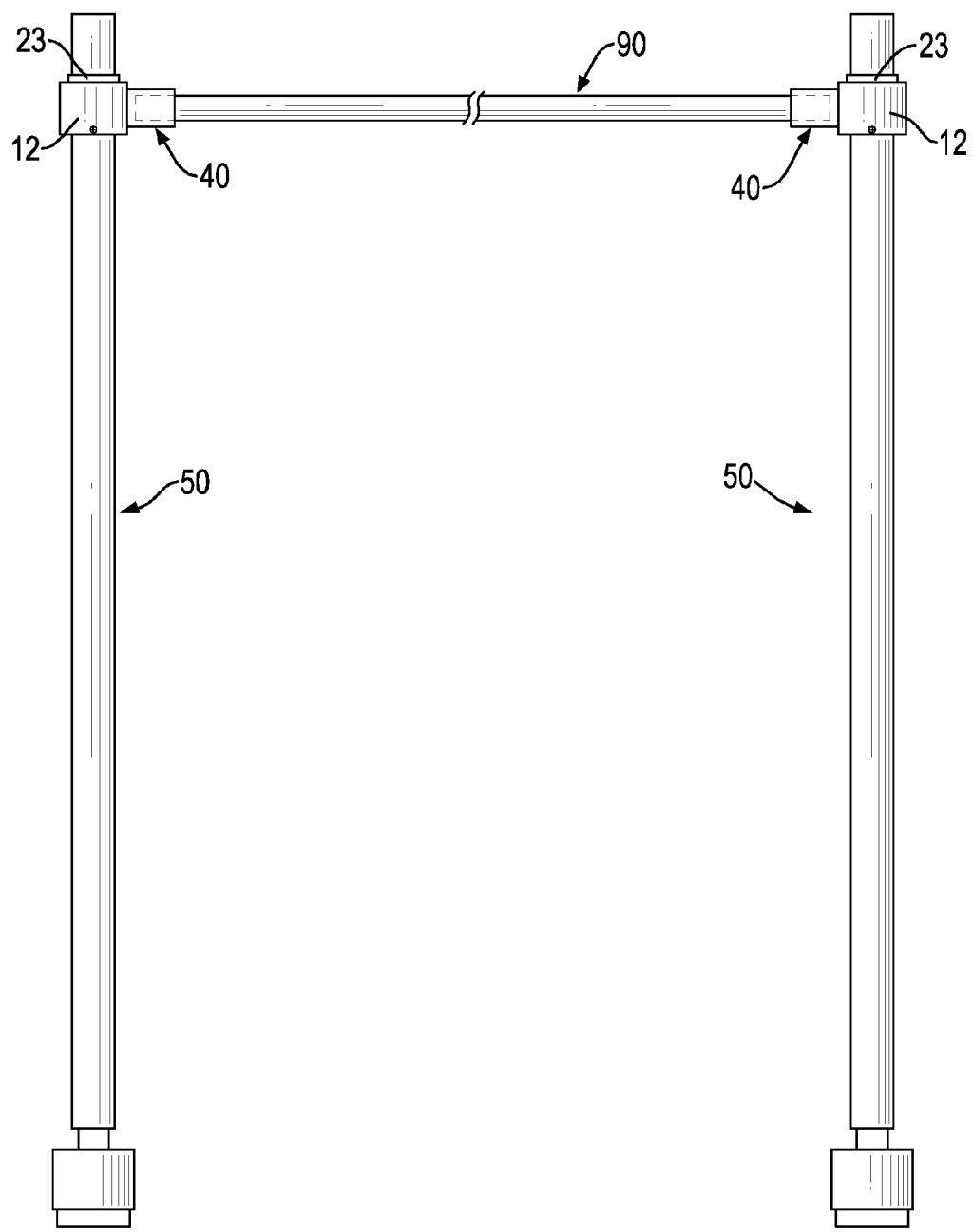
FIG. 9 is an operational side view of the lifting-adjusting assembly in FIG. 1 to form a clotheshorse.

The hanging device 40, 40' is connected to the outer device 10, 10' and may be a hanging board connected to the base 11, 11' at a side opposite to the moving mount 20, 20' as shown in FIGS. 1 and 10 to hang an object on the lifting-adjusting assembly or may be a connecting tube formed on and protruding from the external surface of the mounting casing 12 as shown in FIG. 9 to connect with a transverse shaft 90.

Figure 15:
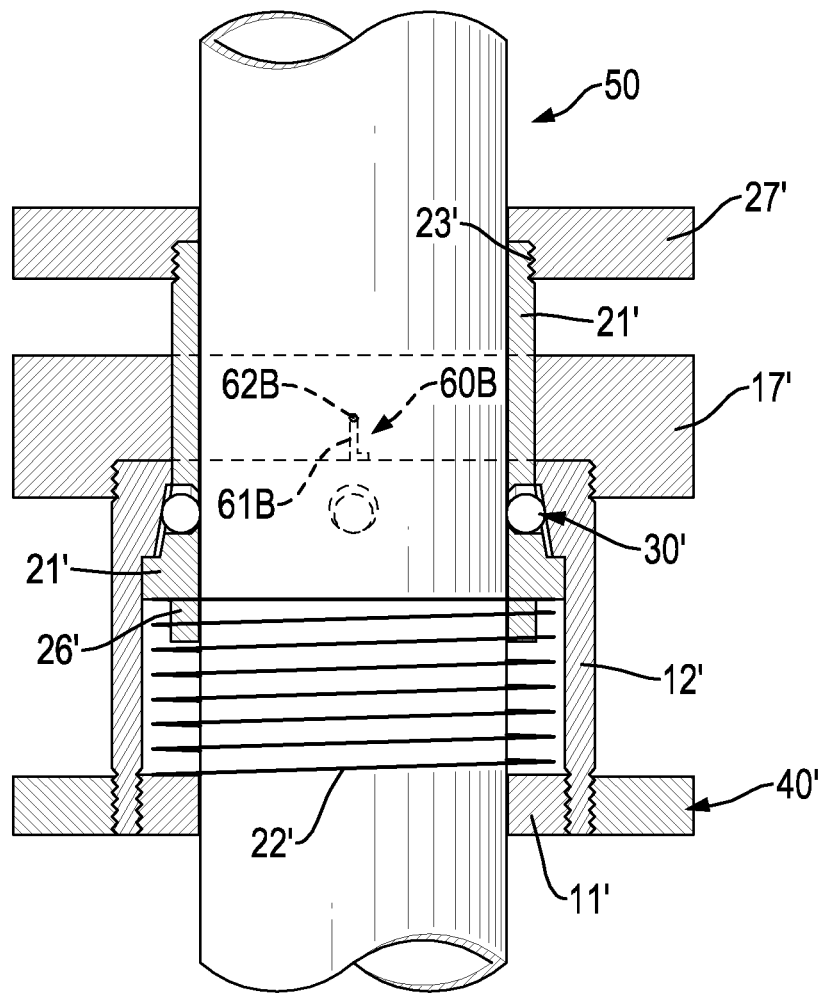
FIG. 15 is a side view in partial section of a second embodiment of a limiting device of the lifting-adjusting assembly in FIG. 10.
Figure 17:
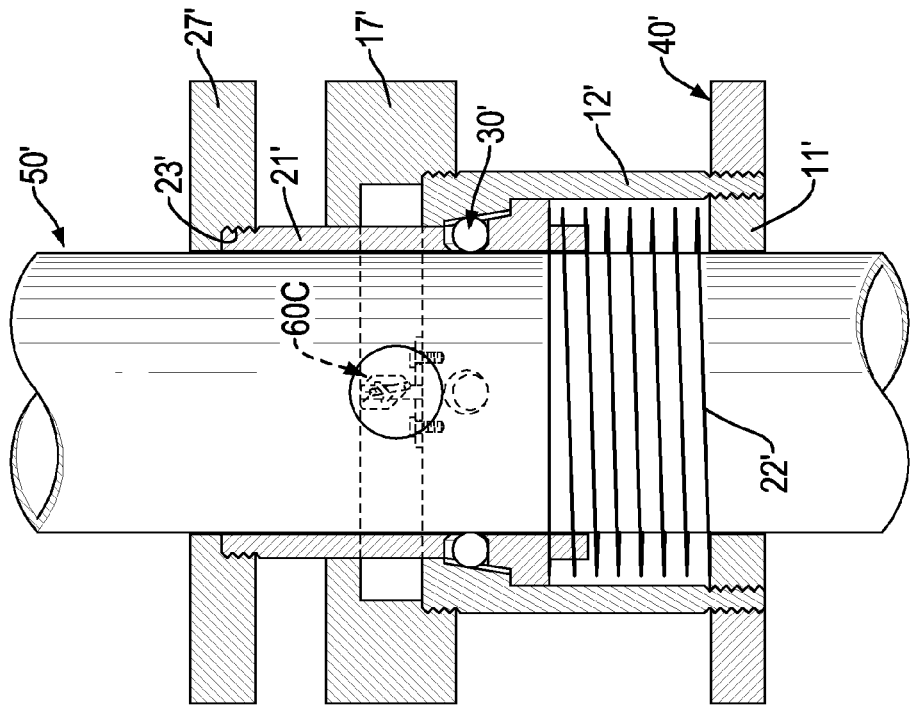
FIG. 17 is a side view in partial section of a third embodiment of a limiting device of the lifting-adjusting assembly in FIG. 10.
Figure 17A:
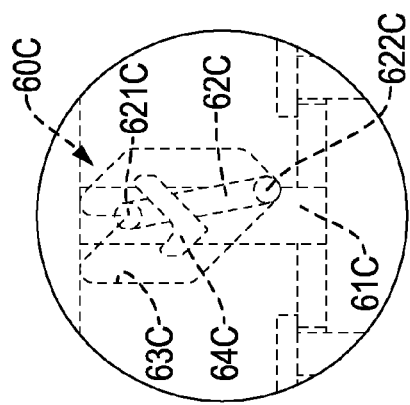
FIG. 17A is an enlarged side view in partial section of the limiting device of the lifting-adjusting assembly in FIG. 17.
Figure 18:
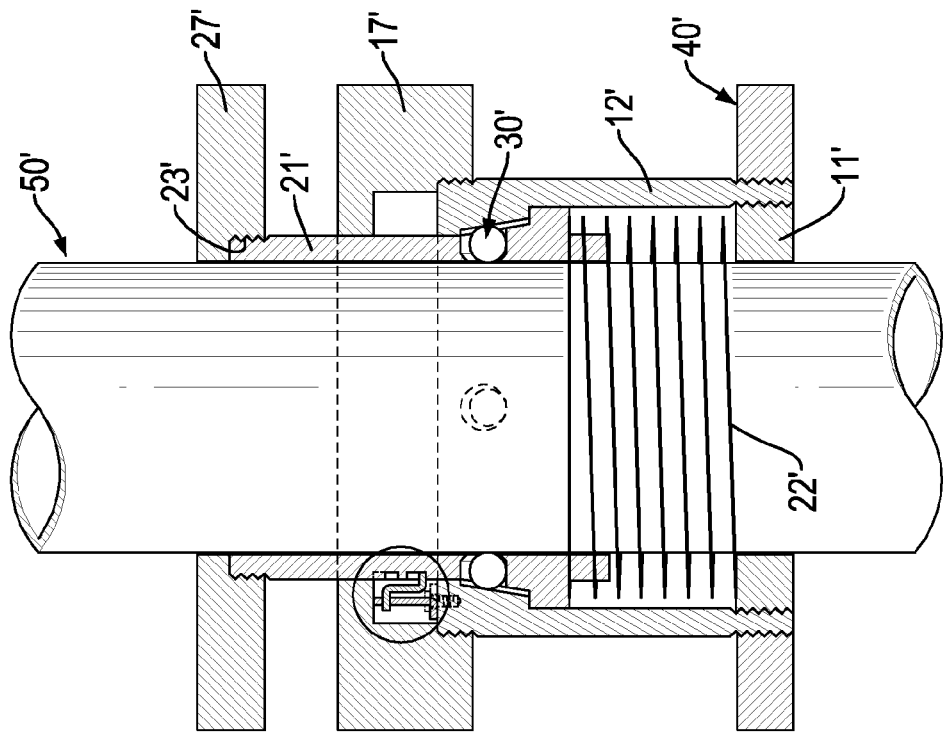
FIG. 18 is another side view in partial section of the third embodiment of the limiting device of the lifting-adjusting assembly in FIG. 10.
Figure 18A:
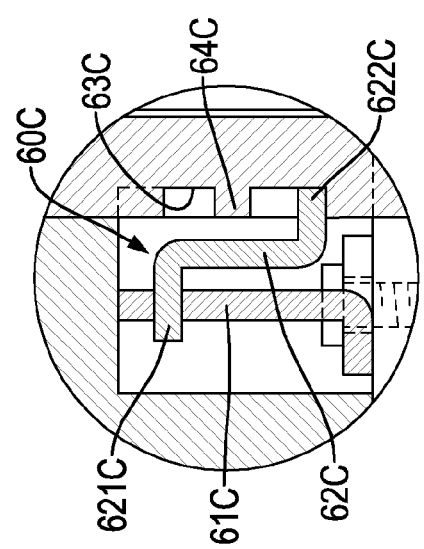
FIG. 18A is an enlarged side view in partial section of the limiting device of the lifting-adjusting assembly in FIG. 18.
Figure 19:
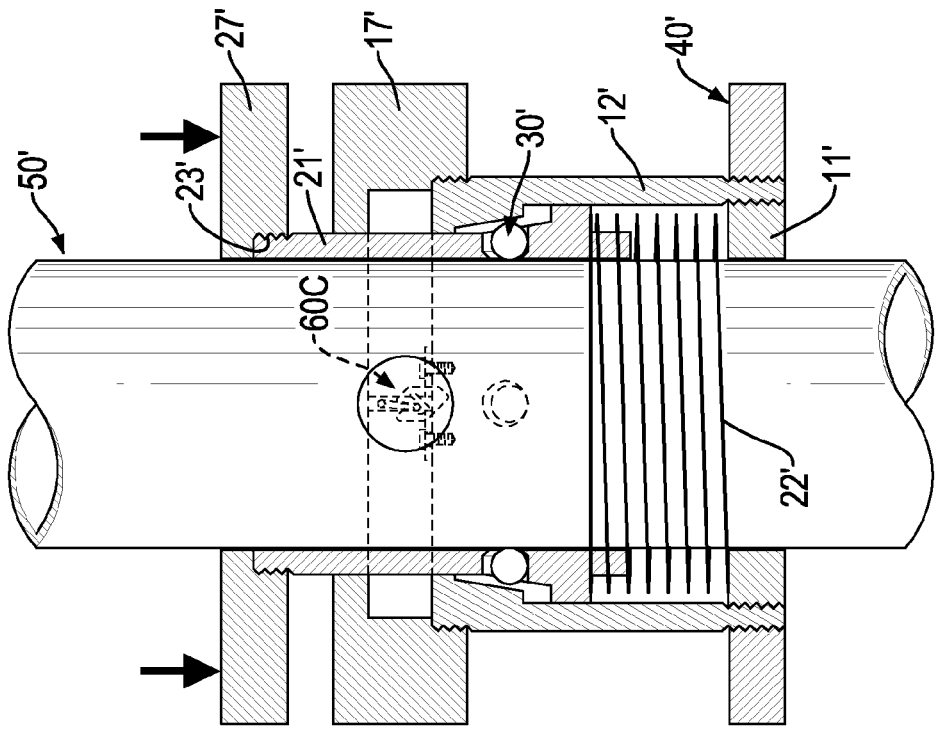
FIG. 19 is an operational side view in partial section of the limiting device in FIG. 17.
Figure 19A:
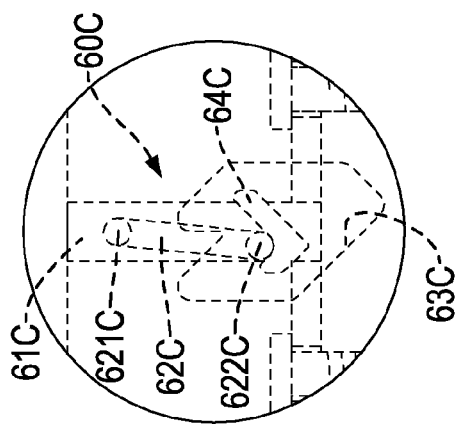
FIG. 19A is an enlarged operational view in partial section of the limiting device in FIG. 17A.
Figure 20:
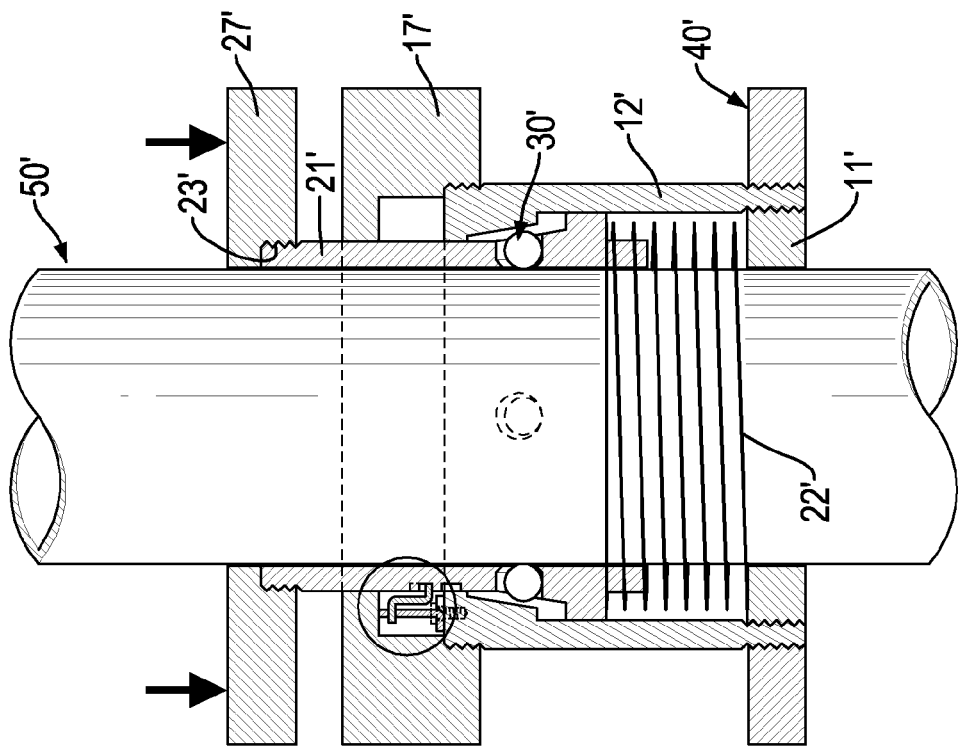
FIG. 20 is another operational side view in partial section of the limiting device in FIG. 18.
Figure 20A:
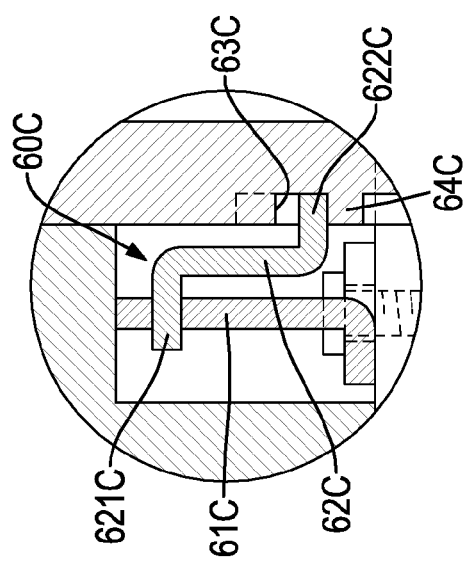
FIG. 20A is an enlarged operational view in partial section of the limiting device in FIG. 18A.
Figure 21A:
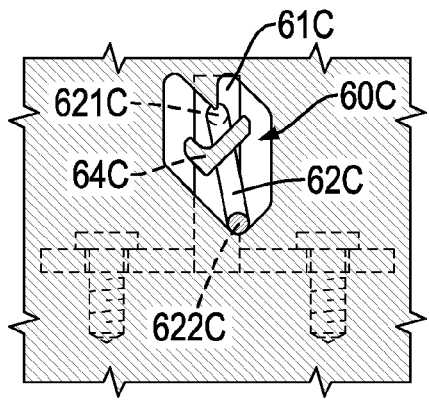
FIGS. 21A to 21F are enlarged and continuous operational side views in partial section of the limiting device in FIG. 17
Figure 21F:
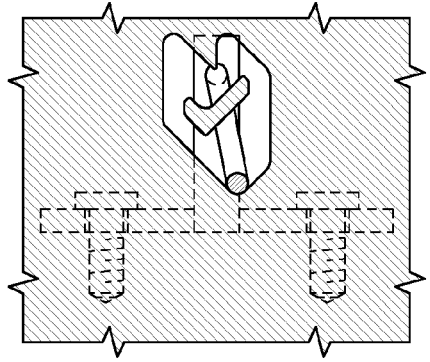
Figure 21B:
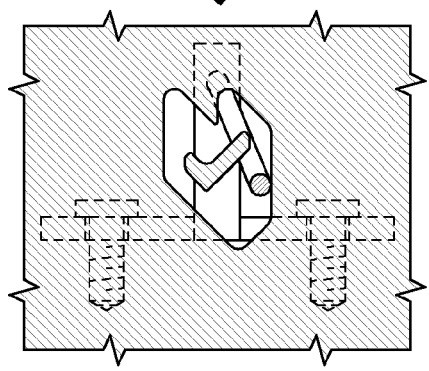
Figure 21E:
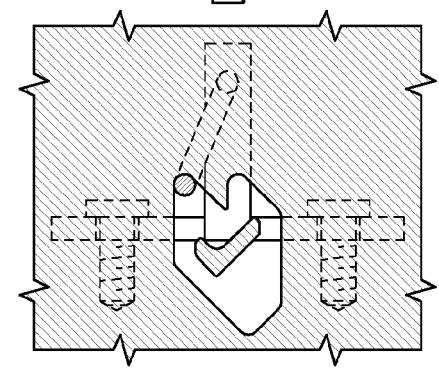
Figure 21C:
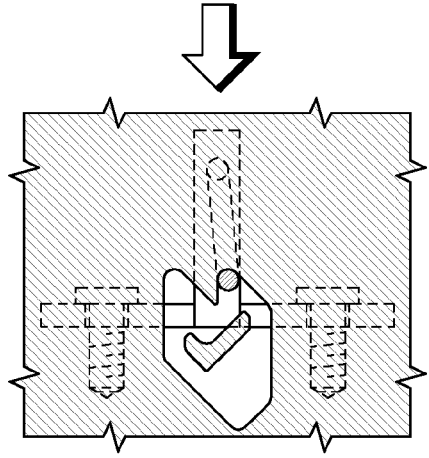
Figure 21D:
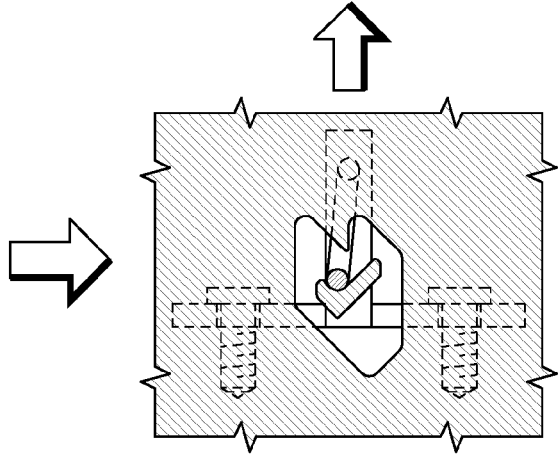

With reference to FIGS. 13, 15 and 17, the lifting-adjusting assembly in accordance with the present invention may further have a limiting device 60A, 60B, 60C mounted between the upper cover 17', the moving mount 21' and the mounting casing 12' to prevent the positioning elements 30' from engaging between the cone surface 15' of the mounting casing 12' and the external surface of the shaft 50.

With reference to FIG. 13, the first embodiment of the limiting device 60A is movably mounted in the upper cover 17' and has a limiting rod 61A, a returning element 62A and a holding head 63A. The limiting rod 61A is movably mounted in the mounting channel 172' of the upper cover 17' and has two ends. One of the ends of the limiting rod 61A extends out of the upper cover 17' via the mounting recess 171' and the other end of the limiting rod 61A extends into the upper cover 17', abuts with the external surface of the moving mount 21' and has an annular flange. The retaining element 62A may be a spring and is mounted around the limiting rod 61A and abuts with the annular flange and the internal surface of the upper cover 17'. The holding head 63A is mounted around the end of the limiting rod 61A that extends out of the upper cover 17', is movably mounted in the mounting recess 171' of the upper cover 17' and has a gap relative to a bottom of the mounting recess 171'.

With reference to FIG. 15, the second embodiment of the limiting device 60B is mounted between the upper cover 17' and the moving mount 21' and has a limiting channel 61B and a limiting protrusion 62B. The limiting channel 61B is L-shaped, is formed in the internal surface of the upper cover 17' and has a horizontal section. The limiting protrusion 62B is formed on and protrudes from the external surface of the moving mount 21' and is movably mounted in the limiting channel 61B.

With reference to FIGS. 17, 17A, 18 and 18A, the third embodiment of the limiting device 60C is mounted between the mounting casing 12' and the moving mount 21' and has a limiting mount 61C, a guiding recess 63C, a holding arm 64C and a limiting pin 62C. The limiting mount 61C is mounted securely on the upper end of the mounting casing 12' below the upper cover 17'. The guiding recess 63C is formed in the external surface of the moving mount 21', faces to the limiting mount 61C and has a bottom face. The holding arm 64C is V-shaped, is formed on and protrudes from the bottom face of the guiding recess 63C and faces to the limiting mount 61C. The limiting pin 62C is Z-shaped, is rotatably connected to the limiting mount 61C and is movably mounted in the guiding recess 63C and has a connecting end 621C and a limiting end 622C. The connecting end 621C of the limiting pin 62C is rotatably connected to the limiting mount 61C. The limiting end 622C of the limiting pin 62C is movably mounted in the guiding recess 63C of the limiting mount 61C and may abut with the holding arm 64C.

Figure 5:
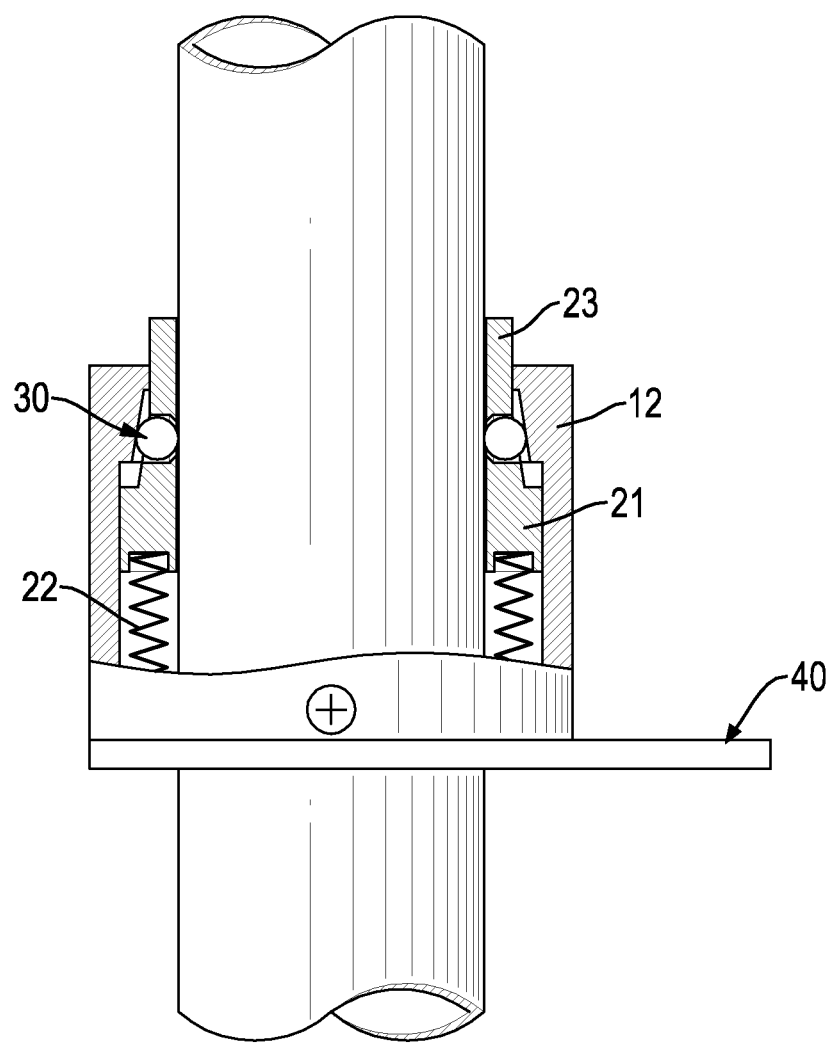
FIG. 5 is another side view in partial section of the lifting-adjusting assembly in FIG. 1 mounted around a shaft.

In use, with reference to FIGS. 2, 5 and 11, the lifting-adjusting assembly in accordance with the present invention can be used to mount around an external surface of a shaft 50 of a display frame, the weight of the lifting-adjusting assembly will cause a downward movement force to the outer device 10, 10' and the at least one spring 22, 22' can provide an upward pushing force to the moving mount 21, 21' so that the opposite forces enable the positioning elements 30, 30' to engage securely between the cone surface 15, 15' of the mounting casing 12, 12' and the external surface of the shaft 50. Then, the engagement between the positioning elements 30, 30', the cone surface 15, 15' and the external surface of the shaft 50 can make the lifting-adjusting assembly securely mounted around the shaft 50 of the display frame. With reference to FIGS. 2 and 5, if an object, such as a bicycle is hung on the handing device 40, the weight of the object can provide an extra downward movement force to the outer device 10 to increase the engaging force between the positioning elements 30, the cone surface 15 and the external surface of the shaft 50. In addition, the cross section of the shaft 50 may be circular, rectangular or elliptic.

Figure 4:
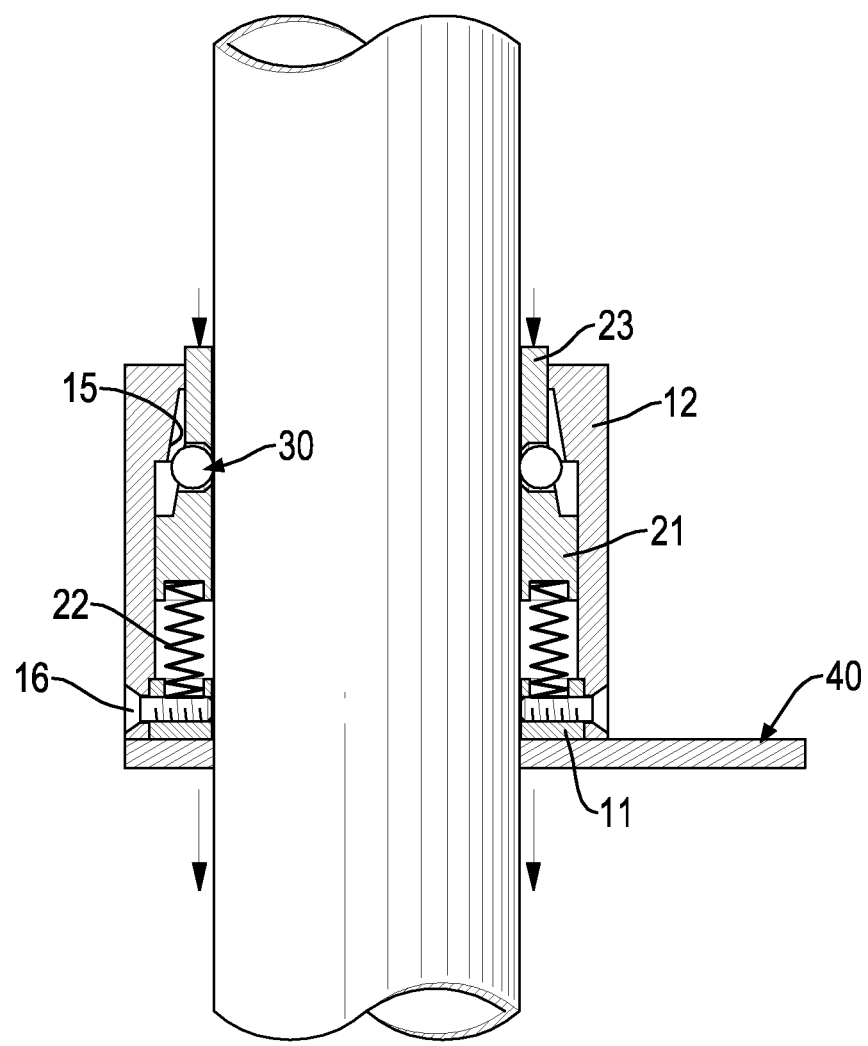
FIG. 4 is an operational side view in partial section of the lifting-adjusting assembly in FIG. 1.
Figure 12:
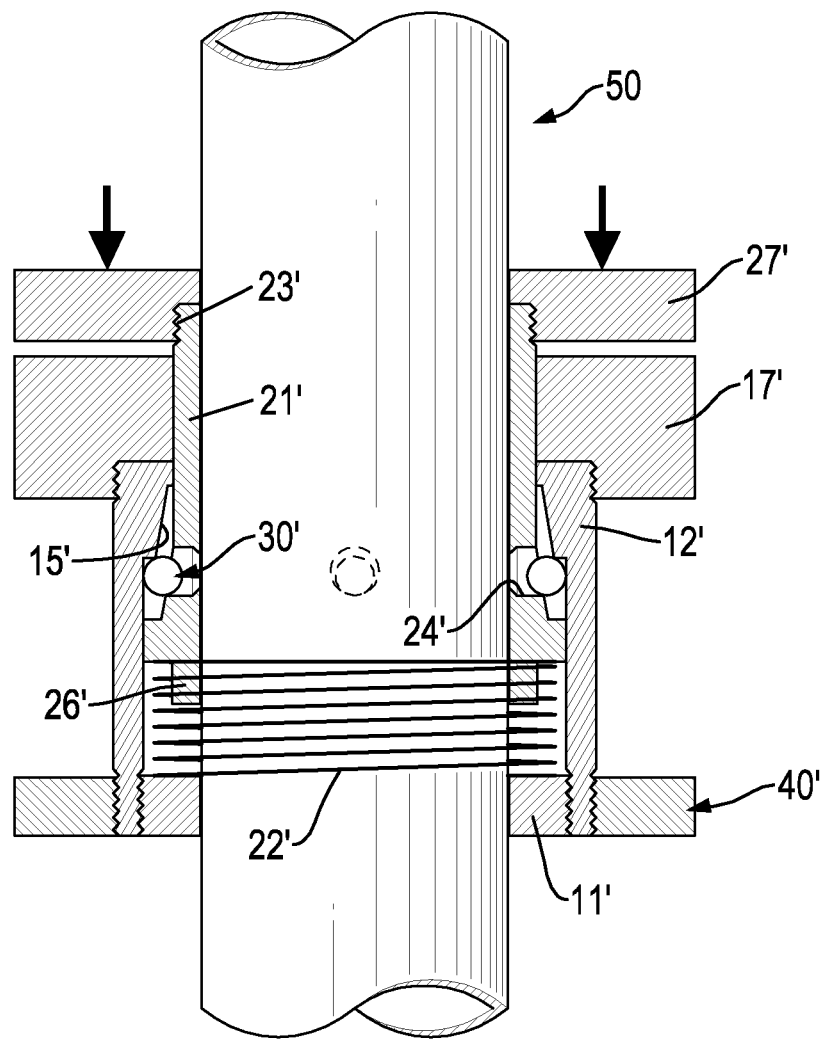
FIG. 12 is an operational side view in partial section of the lifting-adjusting assembly in FIG. 10.

With reference to FIGS. 4 and 12, when a user wants to adjust the position of the lifting-adjusting assembly relative to the shaft 50, the pressing segment 23 of the moving mount 21 or the pressing board 27' is pressed downward to move the moving mount 21, 21' downward relative to the mounting casing 12, 12' and to press the at least one spring 22, 22'. Then, the positioning elements 30, 30' can be separated from the cone surface 15, 15' of the mounting casing 12, 12' and this will decrease the engaging force between the positioning elements 30, 30', the cone surface 15, 15' and the external surface of the shaft 50 and the lifting-adjusting assembly can be move upward or downward relative to the shaft 50 to adjust the position of the lifting-adjusting assembly.

Figure 6:
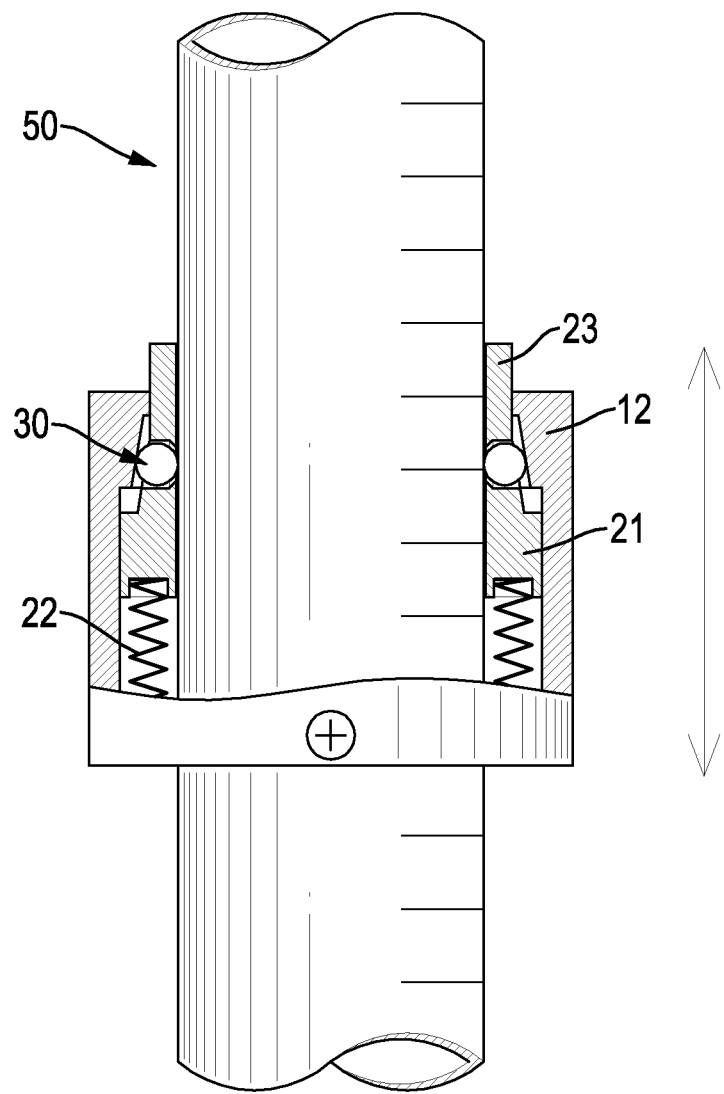
FIG. 6 is an operational side view in partial section of the lifting-adjusting assembly in FIG. 1 mounted around a shaft with graduations for pole vaulting.

With reference to FIG. 6, the lifting-adjusting assembly in accordance with the present invention also can be mounted around a shaft 50 with graduations for pole vaulting and the user can adjust the position of the lifting-adjusting assembly relative to the shaft 50 according to the graduations.

Figure 7:
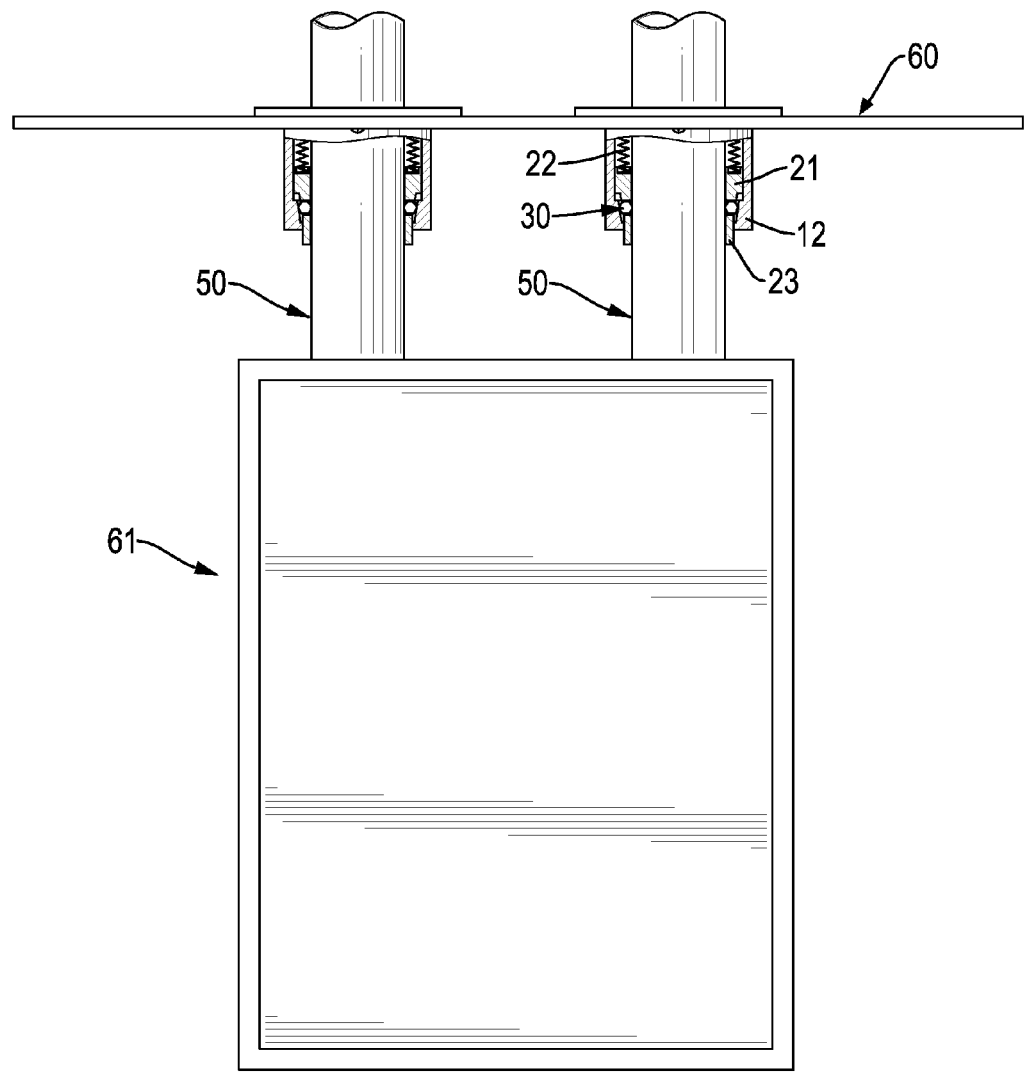
FIG. 7 is an operational side view in partial section of the lifting-adjusting assembly in FIG. 1 mounted between a ceiling and a signboard.

With reference to FIG. 7, the base 11 of the outer device 10 can be mounted on a ceiling 60 and the lifting-adjusting assembly can be mounted around a shaft 50 of a signboard 61. The weight of the signboard 61 and the moving mount 21 can provide a downward movement force to enable the positioning elements 30 to engage securely between the cone surface 15 of the mounting casing 12 and the external surface of the shaft 50. In addition, the user can push the pressing segment 23 of the moving mount 21 upward to enable the positioning elements 30 to separate from the cone surface 15 of the mounting casing 12 and the lifting-adjusting assembly can be moved upward or downward relative to the shaft 50 to adjust the position of the signboard 61.

Figure 8:
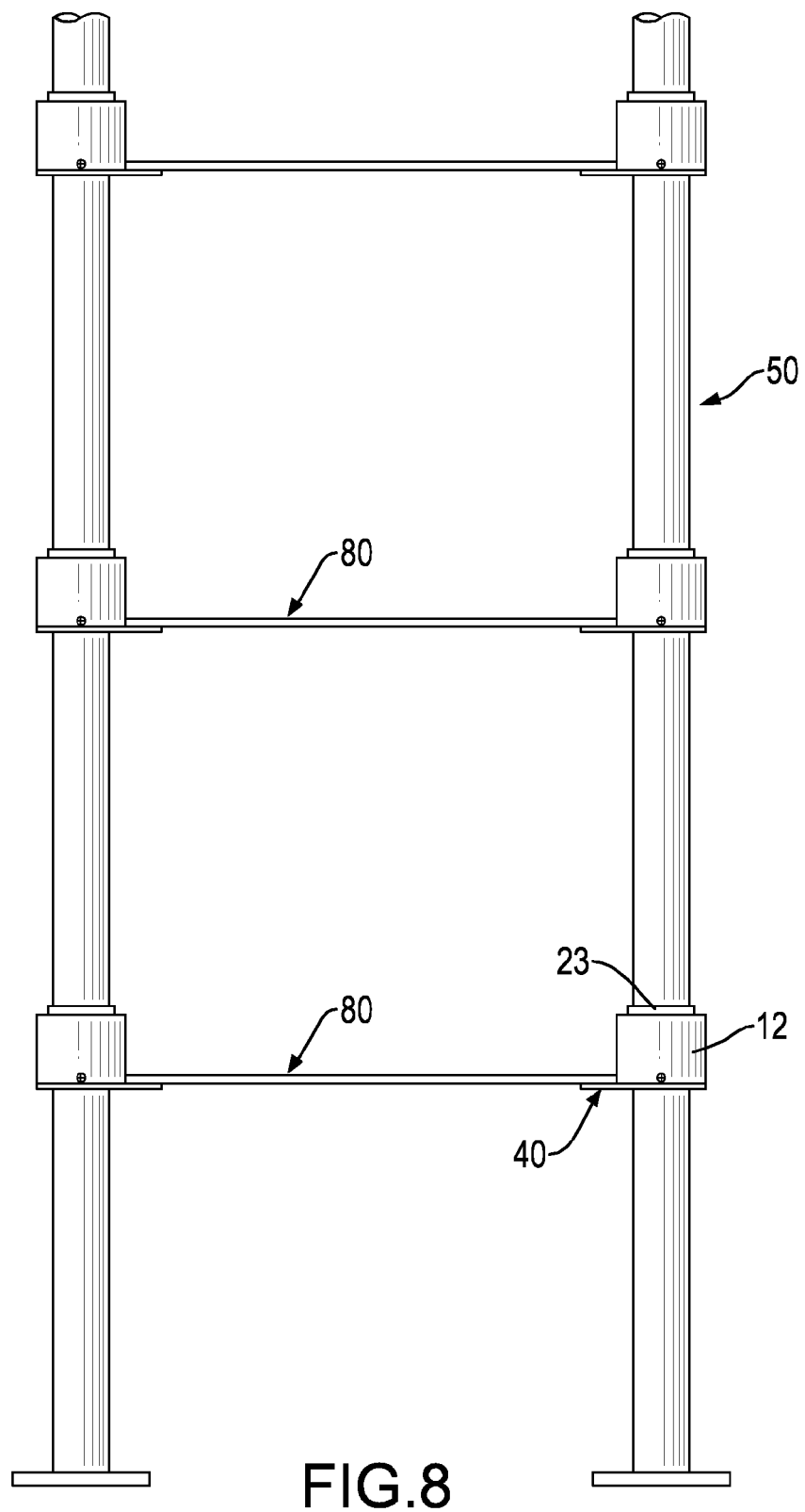
FIG. 8 is an operational side view of the lifting-adjusting assembly in FIG. 1 to form a display frame.

With reference to FIG. 8, multiple lifting-adjusting assemblies in accordance with the present invention can be respectively mounted around multiple adjacent and separate shafts 50 of a display frame, and clapboards 80 can be mounted between hanging boards of the hanging devices 40 of the lifting-adjusting assemblies. In addition, the adjacent clapboards 80 between the shafts 50 can be adjusted as desired by moving the lifting-adjusting assemblies relative to the shafts 50 of the display frame.

With reference to FIG. 9, a pair of the lifting-adjusting assemblies in accordance with the present invention can be respectively mounted around two adjacent and separate shafts 50, and a transverse shaft 90 can be mounted between the connecting tubes of the hanging devices 40 to form a U-shaped clotheshorse. The height of the transverse shaft 90 can be adjusted by moving the lifting-adjusting assemblies relative to the shafts 50.

Therefore, the lifting-adjusting assembly in accordance with the present invention can be moved upward or downward relative to the shaft 50 by pressing the pressing segment 23 of the moving mount 21 or the pressing board 27' to enable the moving mount 21, 21' to move relative to the mounting casing 12, 12'. Then, the position of the lifting-adjusting assembly can be adjusted relative to the shaft 50 as desired and this is convenient in use. Furthermore, when the lifting-adjusting assembly in accordance with the present invention is mounted around a shaft 50, multiple connecting holes are not needed to be formed in external surface of the shaft 50 and this can provide a preferred appearance for the shaft 50.

Additionally, when a pair of lifting-adjusting assemblies in accordance with the present invention is mounted around two shafts 50 of a clotheshorse or a display frame that has a long distance between the shafts 50, the pair of lifting-adjusting assemblies at a large interval can be adjusted one by one. With reference to FIGS. 13, 15 and 17, the embodiments of the limiting devices 60A, 60B, 60C of the lifting-adjusting assembly can be applied to the clotheshorse or the display frame that has a long distance between the shafts 50.

Figure 14:
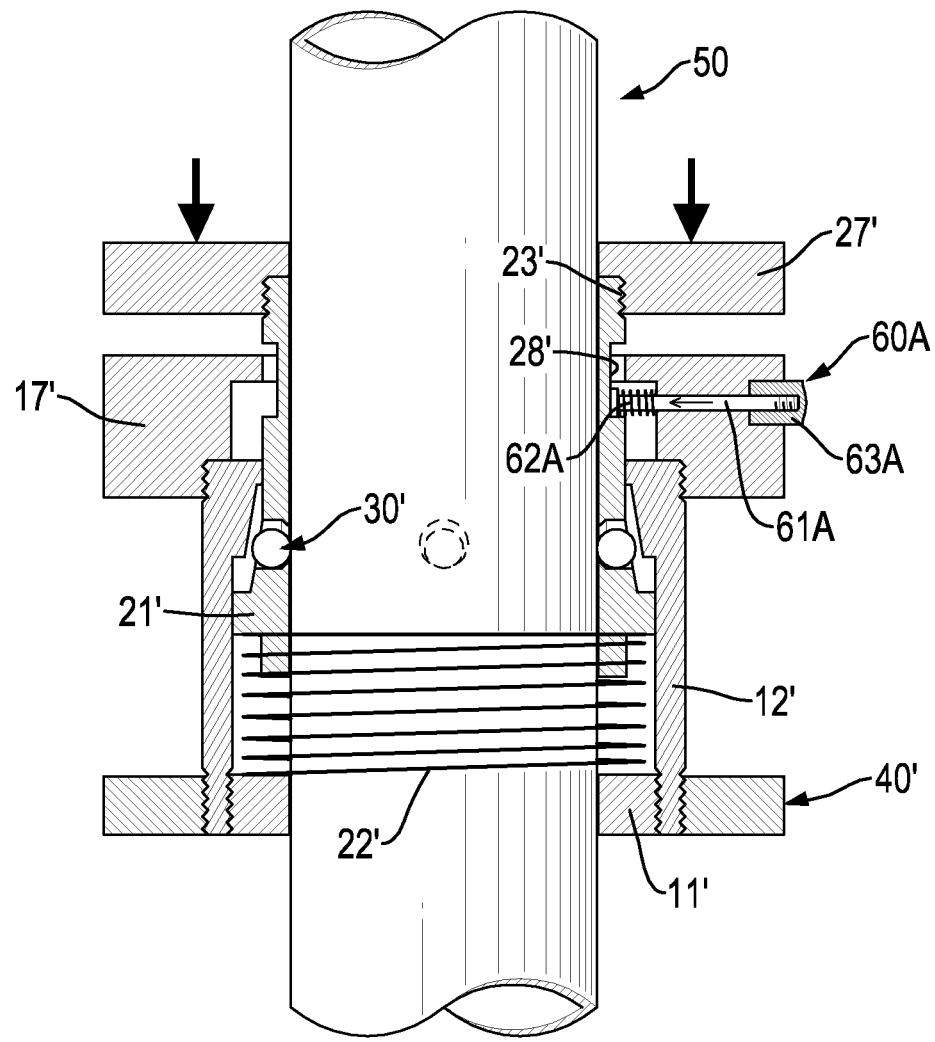
FIG. 14 is an operational side view in partial section of the limiting device in FIG. 13.

In the first embodiment of the limiting device 60A, with reference to FIGS. 13 and 14, when the user wants to adjust the position of the transverse shaft between the shafts 50, the user can press the pressing board 27' downward to enable the limiting recess 28' of the moving mount 21' to move into the upper cover 17 and to face to the limiting device 60A. When the limiting recess 28' moves into the upper cover 17', the returning element 62A between the flange of the limiting rod 61A and the internal surface of the upper cover 17' will push the limiting rod 61A to move into the limiting recess 28' to prevent the moving mount 21' from moving back to the original location by the at least one spring 22'. Then, the moving mount 21' is kept from moving back to the original location by the limiting device 60A and the positioning elements 30' do not engage between the external surface of the shaft 50 and the cone surface 15' of the mounting casing 12' to make the lifting-adjusting assembly movable upward or downward relative to the shaft 50.

After the moving mounts 21' of the pair of lifting-adjusting assemblies have been limited by the limiting devices 60A, the transverse shaft between the pair of lifting-adjusting assemblies can be moved relative to the shafts 50 to a desired position. When the transverse shaft moves to the desired position, the user can first pull the limiting rod 61A of one of the pair of lifting-adjusting assemblies outward relative to the corresponding upper cover 17' to enable the moving mount 21' to move back to the original positions by the spring 22'. After the above mentioned limiting device 60A has been separated from the moving mount 21', the user can support the transverse shaft with a hand and move and separate the limiting device 60A from the moving mount 21' of the other lifting-adjusting assembly to enable the other lifting-adjusting assembly to engage the corresponding shaft 50. Then, the transverse shaft can be held on the desired position by the positioning elements 30' engaging between the external surfaces of the shafts 50 and the cone surfaces of the mounting casings 12'.

Figure 16:
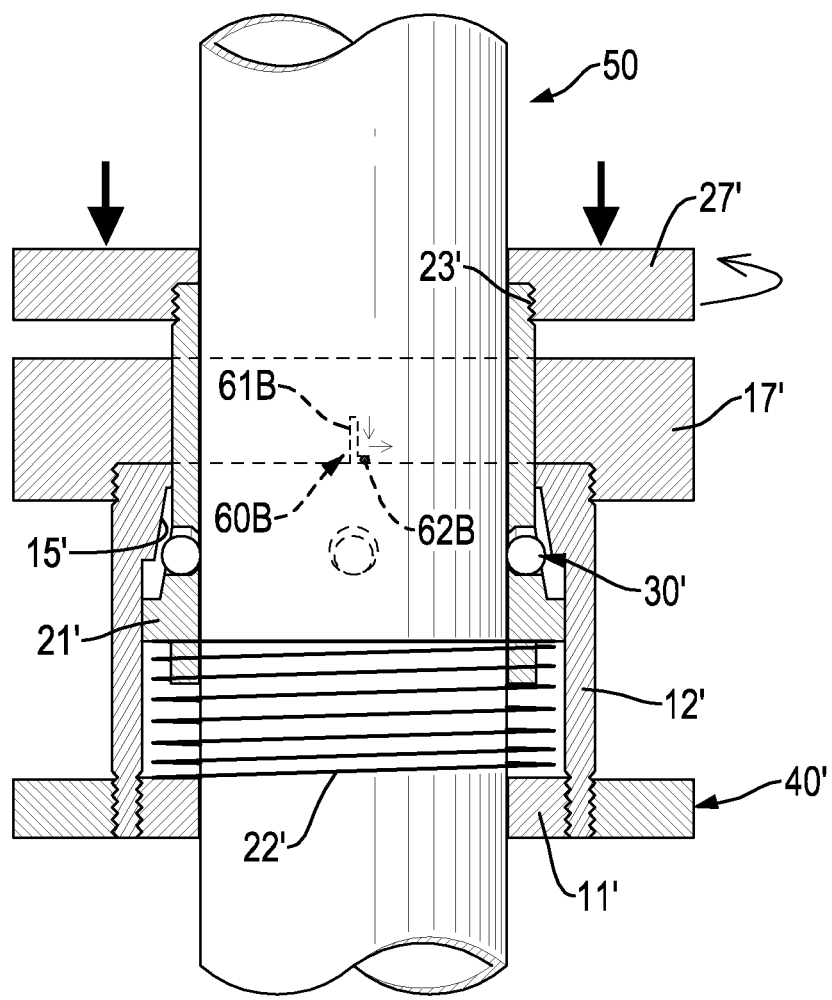
FIG. 16 is an operational side view of the limiting device in FIG. 15.

Furthermore, in the second embodiment of the limiting device 60B, with reference to FIGS. 15 and 16, the user can push the pressing board 27' downward and rotate the moving mount 21' rotating relative to the upper cover 17'. Then, the limiting protrusion 62B of the limiting device 60B will move along the limiting channel 61B and move at the horizontal section of the limiting channel 61B and engage the upper cover 17' in the horizontal section of the limiting channel 62B to prevent the moving mount 21' from moving upward back to the original position. Then, the transverse shaft between the pair of lifting-adjusting assemblies can be moved relative to the shafts 50 to a desired position and the user can rotate the pressing board 27' relative to the upper covers 17' to enable the limiting protrusion 62B to move back to the original positions by the springs 22' and the transverse shaft can be held on the desired position by the positioning elements 30' engaging between the external surfaces of the shafts 50 and the cone surfaces of the mounting casings 12'.

In addition, with reference to FIGS. 17, 17A, 18, 18A and 21A to 21D, when the user presses the pressing board 27' downward relative to the upper cover 17', the guiding recess 63C will move downward to enable connecting end 621C of the limiting pin 62C to rotate relative to the limiting mount 61C and to enable the limiting end 622C of the limiting pin 62C to rotate and move along the guiding recess 63C and to abut with the holding arm 64C as shown in FIGS. 19, 19A, 20 and 20A and this can prevent the moving mount 21' from moving upward back to the original position by the at least one spring 22'. Then, the transverse shaft between the pair of lifting-adjusting assemblies can be moved relative to the shafts 50 to a desired position and the user can press the pressing board 27' again to enable the limiting end 622C of the limiting pin 62C to separate from the holding arm 64C and to rotate back to the original positions as shown in FIGS. 17, 18, 21E and 21F and the transverse shaft can be held on the desired position by the positioning elements 30' engaging between the external surfaces of the shafts 50 and the cone surfaces of the mounting casings 12'.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lifting-adjusting assembly for a shaft comprising:
   an outer device being adapted to mount around an external surface of the shaft and having
      a base having
         a central hole formed through the base to mount around the external surface of the shaft;
         a top surface; and
         a sidewall; and
      a mounting casing mounted securely around the base and having
         a lower end;
         an upper end;
         an external surface;
         a chamber formed in the mounting casing to mount around the external surface of the shaft and the sidewall of the base;
         an opening formed through the upper end of the mounting casing and communicating with the chamber to enable the shaft to extend out of the upper end of the mounting casing; and
         a cone surface annularly formed in the mounting casing adjacent to the opening;
   an inner device movably connected to the outer device and having
      a moving mount being hollow, movably mounted in the outer device between the base and the mounting casing and having
         a bottom end;
         a top end;
         an external surface;
         a mounting chamber formed through the moving mount to mount around the external surface of the shaft;
         a pressing segment formed on the top end of the moving mount and extending out of the upper end of the mounting casing via the opening; and
         multiple positioning holes radially formed through the external surface of the moving mount at intervals, communicating with the mounting chamber and facing to the cone surface of the mounting casing; and
      at least one spring mounted in the chamber between the base and the moving mount to push the pressing segment of the moving mount extending out of the opening of the mounting casing and to enable the positioning holes facing to the cone surface of the mounting casing; and
   multiple positioning elements respectively mounted in the positioning holes of the moving mount and abutting with the cone surface of the mounting casing to abut with the external surface of the shaft to hold the lifting-adjusting assembly on the shaft.

2. The lifting-adjusting assembly as claimed in claim 1, wherein the lifting-adjusting assembly has a hanging device connected to the outer device.

3. The lifting-adjusting assembly as claimed in claim 2, wherein the hanging device is a hanging board and is connected to the base at a side opposite to the moving mount.

4. The lifting-adjusting assembly as claimed in claim 2, wherein the hanging device is a connecting tube and is formed on and protrudes from the external surface of the mounting casing.

5. The lifting-adjusting assembly as claimed in claim 2, wherein
   the base has multiple retaining recesses formed in the top surface of the base at intervals around the central hole of the base;
   the moving mount has multiple holding recesses formed in the bottom end of the moving mount at intervals and corresponding to the retaining recesses of the base; and the inner device has multiple springs mounted between the retaining recesses of the base and the holding recesses of the moving mount.

6. The lifting-adjusting assembly as claimed in claim 5, wherein the mounting casing has multiple fasteners mounted through the external surface of the mounting casing at intervals near the lower end of the mounting casing and connected securely to the sidewall of the base to hold the base securely in the mounting casing.

7. The lifting-adjusting assembly as claimed in claim 6, wherein each position element is a steel ball.

8. The lifting-adjusting assembly as claimed in claim 6, wherein each position element is a cylinder.

9. The lifting-adjusting assembly as claimed in claim 2, wherein
   the base has a threaded surface formed on the sidewall of the base; and
   the mounting casing has a threaded ring formed on and protruding from the lower end of the mounting casing and screwed with the threaded surface of the base to hold the base securely in the mounting casing.

10. The lifting-adjusting assembly as claimed in claim 9, wherein
    the moving mount has a holding ring formed on and protruding downwardly from the bottom end of the moving mount and facing to the top surface of the base; and
    the inner device has one spring mounted between the top surface of the base and the bottom end of the moving mount around the holding ring.

11. The lifting-adjusting assembly as claimed in claim 10, wherein
    the mounting casing has an upper cover mounted securely around the upper end of the mounting casing to mount around the external surface of the shaft; and
    the pressing segment of the moving mount extends out of the upper cover of the mounting casing.

12. The lifting-adjusting assembly as claimed in claim 11, wherein the moving mount has a pressing board screwed with the pressing segment of the moving mount above the upper cover of the mounting casing and mounted around the external surface of the shaft.

13. The lifting-adjusting assembly as claimed in claim 12, wherein the lifting-adjusting assembly has a limiting device mounted between the upper cover, the moving mount and the mounting casing to prevent the positioning elements from engaging between the cone surface of the mounting casing and the external surface of the shaft.

14. The lifting-adjusting assembly as claimed in claim 13, wherein
    the upper cover has
       an external surface;
       an internal surface;
       a mounting recess radially formed in the external surface of the upper cover; and
       a mounting channel formed through the upper cover and communicating with the mounting recess; and
    the moving mount has a limiting recess formed annularly in the external surface of the moving mount near the top end of the moving mount; and
    the limiting device is movably mounted in the upper cover and has
       a limiting rod movably mounted in the mounting channel of the upper cover and having two ends, one of the ends of the limiting rod extending out of the upper cover via the mounting recess and the other end of the limiting rod extending into the upper cover, abutting with the external surface of the moving mount and having an annular flange;
       a returning element mounted around the limiting rod and abutting with the annular flange and the internal surface of the upper cover; and
       a holding head mounted around one of the ends of the limiting rod, movably mounted in the mounting recess of the upper cover and having a gap relative to a bottom of the mounting recess.

15. The lifting-adjusting assembly as claimed in claim 13, wherein the limiting device is mounted between the upper cover and the moving mount and has
    a limiting channel being L-shaped, formed in the internal surface of the upper cover and having a horizontal section; and
    a limiting protrusion formed on and protruding from the external surface of the moving mount and movably mounted in the limiting channel.

16. The lifting-adjusting assembly as claimed in claim 13, wherein the limiting device is mounted between the mounting casing and the moving mount and has
    a limiting mount mounted securely on the upper end of the mounting casing below the upper cover;
    a guiding recess formed in the external surface of the moving mount, facing to the limiting mount 61C and having a bottom face;
    a holding arm being V-shaped, formed on and protruding from the bottom surface of the guiding recess and facing to the limiting mount; and
    a limiting pin being Z-shaped, rotatably connected to the limiting mount and movably mounted in the guiding recess and having
       a connecting end rotatably connected to the limiting mount; and
       a limiting end movably mounted in the guiding recess of the limiting mount to abut with the holding arm.

17. The lifting-adjusting assembly as claimed in claim 13, wherein each position element is a steel ball.

18. The lifting-adjusting assembly as claimed in claim 13, wherein each position element is a cylinder.

* * * * *